(No Model.) 3 Sheets—Sheet 1.
J. T. ROBBINS.
HOT WATER FURNACE.
No. 545,912. Patented Sept. 10, 1895.
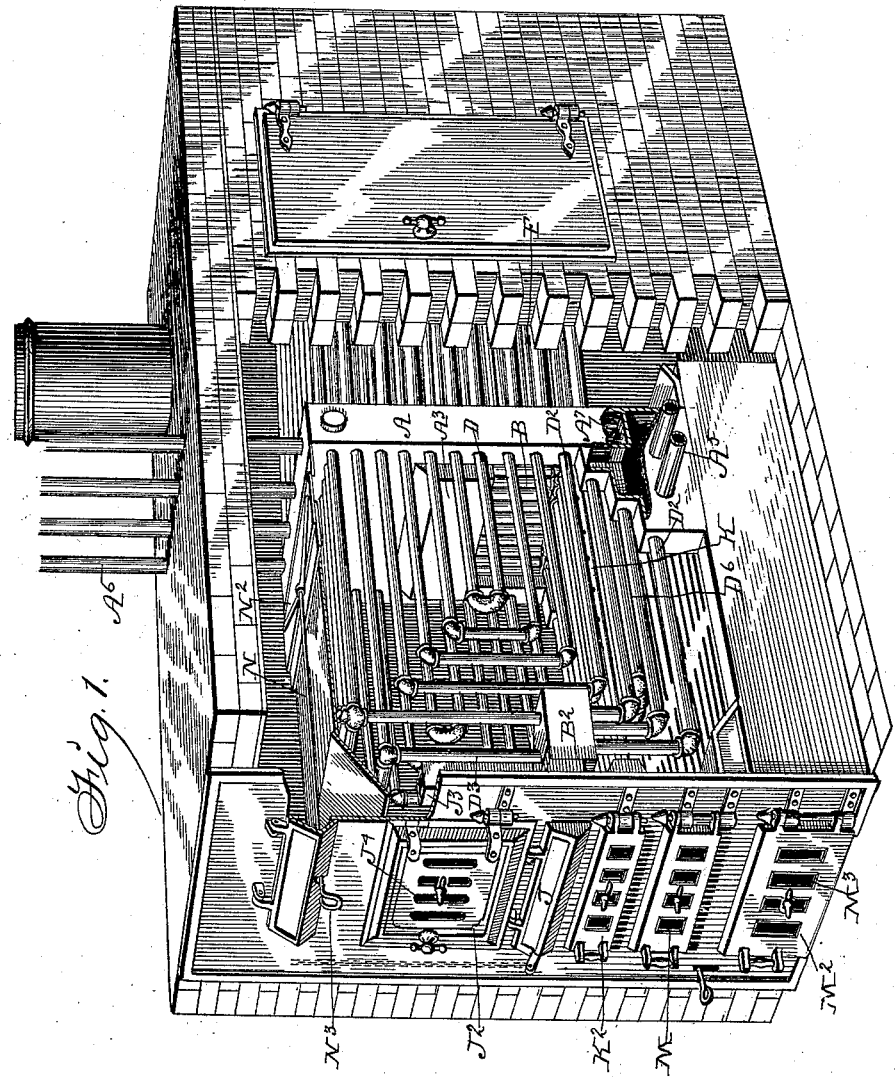
Witnesses:
R. H. Orwig.
Charles F. Wilcox.
Joseph T. Robbins, Inventor.
By Thomas G. and J. Ralph Orwig,
Attorneys.

(No Model.) 3 Sheets—Sheet 2.
J. T. ROBBINS.
HOT WATER FURNACE.
No. 545,912. Patented Sept. 10, 1895.
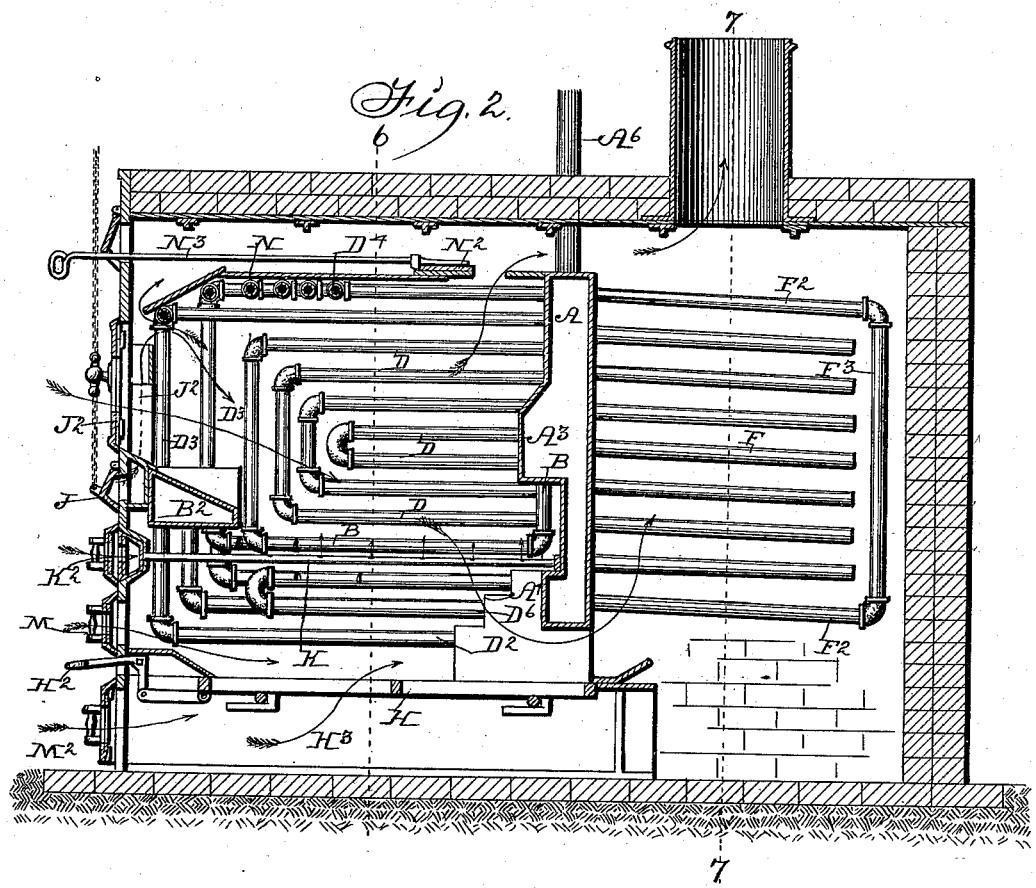
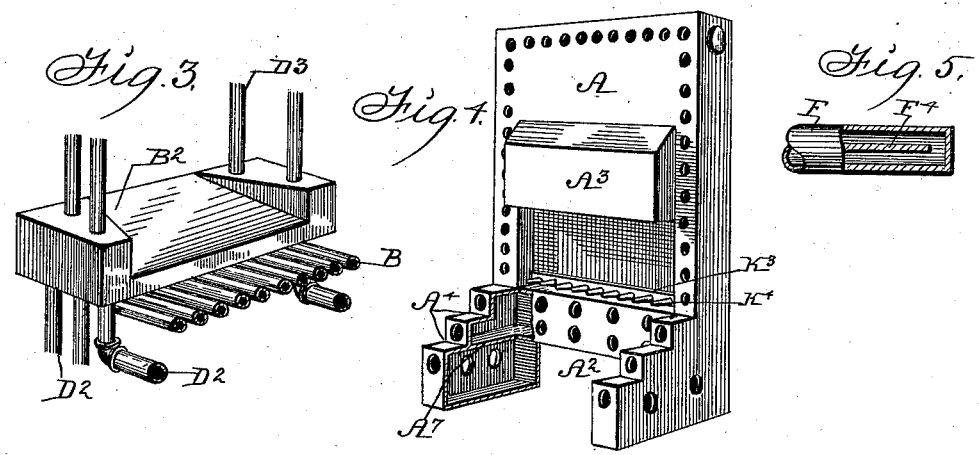
Witnesses:
Charles F. Wilson
R. H. Orwig
Inventor: Joseph T. Robbins
By Thomas G. Orwig
and J. Ralph Orwig, Attorneys (No Model.) 3 Sheets—Sheet 3.
J. T. ROBBINS.
HOT WATER FURNACE.
No. 545,912. Patented Sept. 10, 1895.
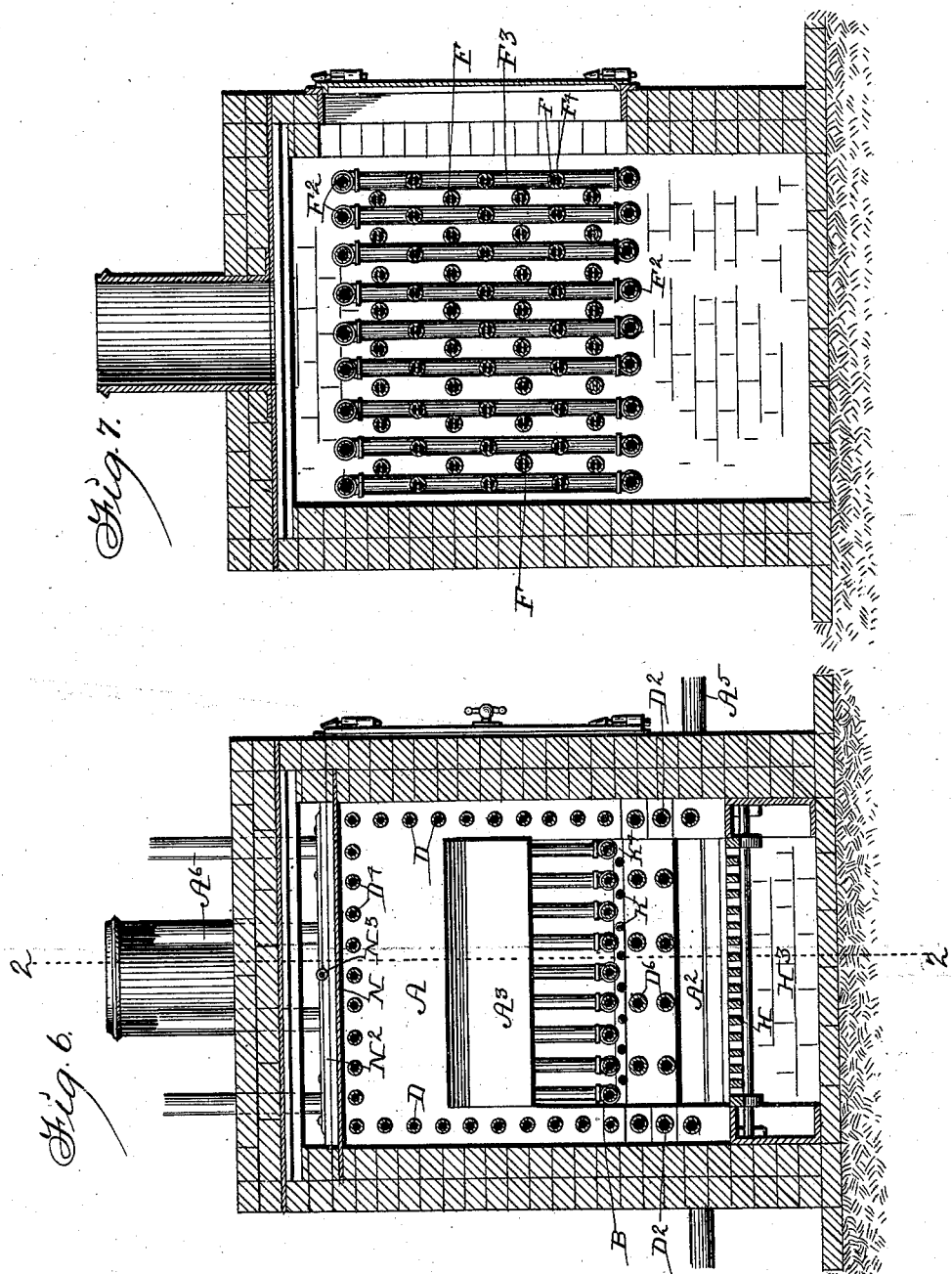
Witnesses:
R. H. Orwig
Charles F. Wilcox
Inventor: Joseph T. Robbins
By Thomas G. and J. Ralph Orwig,
Attorneys.

UNITED STATES PATENT OFFICE.

JOSEPH T. ROBBINS, OF NEWTON, IOWA.

HOT-WATER FURNACE.

SPECIFICATION forming part of Letters Patent No. 545,912, dated September 10, 1895.

Application filed December 11, 1894. Serial No. 531,530. (No model.)

*To all whom it may concern:*

Be it known that I, JOSEPH T. ROBBINS, a citizen of the United States, residing at Newton, in the county of Jasper and State of Iowa, have invented a new and useful Hot-Water Furnace, of which the following is a specification.

The objects of this invention are, first, to provide a furnace in which a maximum of heat is generated with a minimum of fuel and all of the soot, smoke, &c., be consumed by compelling the products of combustion to pass downwardly through the grate and the fuel therein, so that the oxygen in the air is not all consumed before it reaches the fresh fuel, as is the case with updraft-furnaces, and, further, to supply jets of fresh air to the products of combustion as they pass through the grate, and, further, by supplying an auxiliary grate beneath the grate proper to catch any fuel that may pass through the grate and subject the same to the heat generated on the main grate, so as to thoroughly consume said fuel.

My object is further to provide means whereby the heat generated in said fire is used to the best possible advantage in heating water, and, further, to provide a hot-water furnace which shall be durable and not affected by the expansion and contraction of the metals, and a rapid circulation of water be provided therethrough at all times.

My object is further to provide means whereby either a straight or tortuous passage for the air may be provided to promote ease in starting the fire.

With these objects in view my invention consists, first, in the construction and arrangement of the two grates and air-feeding devices relative to each other, so that the products of combustion are made to pass downwardly through the first grate and above the second grate before reaching the flue.

My invention consists, further, in the construction and arrangement of a water-chamber to be located in the central portion of the furnace and extended transversely thereof to form a back for the fire-box and to direct the draft downwardly to pass beneath the central portion of said chamber, and in the arrangement and combination therewith of pipes through which the water may circulate, so as to present a large radiating surface to the heat, and in the manner of connecting the pipes thereto, so that when said pipes are contracted and expanded by heat and cold they will not be torn from the said chamber.

My invention consists, further, in the construction and arrangement of a water-front and the manner of connecting the hot-water pipes thereto, so that they will not be torn loose by the contraction and expansion of the pipes, and, further, in the arrangement and combination of the drafts, dampers, &c., by which the heat and fires are regulated and controlled, and in certain other features of construction, arrangement, and combination of parts, as hereinafter set forth, pointed out in my claims, and illustrated in the accompanying drawings, in which—

Figure 1 is a perspective view of the complete furnace, with parts of the casing removed to show its interior construction. Fig. 2 is a vertical longitudinal sectional view through the line 2 2 of Fig. 1. Fig. 3 is a perspective view of the water front and pipes connected therewith. Fig. 4 is a perspective view of the central partition and water-chamber. Fig. 5 is an enlarged detail view of a portion of one of the pipes leading rearwardly from the center water-elevator into parts broken away to show its interior construction. Fig. 6 is a vertical transverse sectional view through the line 6 6 of Fig. 2, looking rearwardly. Fig. 7 is a like view through the line $x$ $x$ of Fig. 2, looking rearwardly.

Referring to the accompanying drawings, the reference-letter A is used to indicate a metal water-chamber to extend from one side to the other in the approximate central portion of the furnace. In its lower central portion is a passage $A^2$, through which the products of combustion must pass before reaching the flue, and on its upper forward face is an outward projection $A^3$, with a flat under surface, for purposes hereinafter explained. $A^5$ are induction-pipes leading into the said chamber at its bottom, and $A^6$ are the eduction-pipes projecting rearwardly from the top of said chamber. In the lower and central portion of the chamber A is a horizontal bottom $A^7$.

B indicates the main grate, composed of a plurality of water-pipes screwed into the bottom of the projection A³ to project downwardly therefrom a short distance and then forwardly in a horizontal plane and again upwardly at its forward end to enter the water-front B². This water-front is composed of a metal chamber extended transversely of the furnace and having its top central portion inclined downwardly, so that fuel may be directed downwardly toward the fire, and at such a height that it will not interfere with the draft-doors below the fuel-door.

The fire-box is completely surrounded by hot-water pipes, so as to take up all of the heat in said chamber, as follows: D indicates pipes fixed into the sides of the front face of the chamber A to project forwardly along the sides of the combustion-chamber and curved backwardly to enter the same chamber in the same vertical plane. D² indicates pipes leading from the notches A⁴, formed in the chamber A, forwardly and then upwardly into the water-front to fill up the space at the sides of the furnace below the grate, and D³ indicates pipes leading from the water-front upwardly and then horizontally into the chamber A². It will be obvious that by thus providing an elbow or bend in each of these pipes that connect the water-front and the chamber A that when they contract and expand, due to varying degrees of temperature, the said elbow may be easily bent and not tear out the screw-threads in either of said parts, as would be the case if said pipes were passed directly from one to the other. D⁴ indicates pipes to cover the top of the combustion-chamber. They project forwardly from the top of the chamber A and then at right angles and again backwardly into the chamber at the opposite side thereof, and the two forward ones of the pipes indicated by the reference symbol D³ have the transverse horizontal pipes D⁵ to connect the elbow-joints therein with the like portions of the pipes on the opposite pipes. It will now be seen that the entire front of the furnace from the chamber A is lined with pipes in which water is being circulated, and, further, that none of the pipes which connect the water-front with the central chamber are passed directly from one to the other, for the purposes stated. Below the grate are a plurality of pipes D⁶, extended forwardly from the chamber and then curved backwardly to enter the said chamber in the same vertical plane. The rear surface of the chamber A is flat, and a large mass of pipes are screwed thereinto to project rearwardly and fill up the space between the chamber A and the rear wall of the furnace, so as to compel the heat and products of combustion arising from the fire to pass in contact with a large heating-surface before reaching the flue. The pipes indicated by the reference-letter F are straight pipe-sections screwed into the said chamber A in horizontal rows at equal distances apart, and said rows are staggered in vertical line, and the upper and lower pipes F² are connected by the perpendicular pipes F³, so as to completely cover the back of said chamber with water-pipes. The central or straight pipes have a longitudinal partition F⁴, adapted to extend to a point near the outer end of the pipe to aid in the circulation of water therethrough, and all of said pipes are preferably inclined downwardly to aid in the circulation of water therethrough. H indicates a grate located beneath the grate D and of the ordinary construction, preferably provided with means for shaking the same, indicated by the reference-letter H², and H³ indicates the ash-pit below said grate.

The drafts of the furnace are arranged as follows: J indicates a draft-door at the furnace-front below the fire-door. J² and J³ are air-tubes leading upwardly from the door J at the sides of the door J² to discharge said air into the combustion-chamber above the fire-door. J⁴ is a damper in the fire-door through which air may be admitted into the combustion-chamber. K indicates a pluarlity of perforated pipes extended in horizontal alignment directly beneath the grate B, and K² is a draft-door at the furnace-front communicating with said pipes, so that air may be admitted thereinto and discharged directly into the products of combustion as they pass downwardly from the grate B. The inner ends of said pipes are supported by a bar K³, fixed to the chamber A and provided with a plurality of projections K⁴ to enter the ends of said pipes. M indicates a door leading to the chamber between the grate B and the grate H, and M² is a door leading to the ash-pit H³, provided with a damper M³. Placed on top of the pipes D⁴ in the combustion-chamber is a metal plate N, having near its rear end an opening adapted to be covered by a sliding plate or damper N², controlled by a rod N³ leading to the front of the furnace, so that either a direct or indirect draft may be produced—that is, when said damper is opened the products of combustion arising from the grate D may be passed directly through said opening to the flue, and when said damper is closed they will be compelled to pass downwardly through the grate under the chamber A and upwardly through the staggered pipes F before reaching the flue. It is of advantage, however, in starting a fire before a sufficient draft has been produced to carry the products of combustion downwardly beneath the chamber A. A slight space is left between the front edge of the plate N and the furnace-front, so that should any gas or other volatile products of combustion assemble in the chamber at the furnace-front and not be carried downwardly by the drafts through the tubes J³ that said gases or products of combustion may escape to the chimney.

In practical operation when it is desired to start a fire the draft-doors below the grate D are closed and the dampers N² and K² open. Place kindling well over the grate D and start the fire. After the kindling is burning well add fuel, close the damper N and the door J², and open the damper J. The products of combustion will then be compelled to pass downwardly through the grate D and fresh oxygen admitted through the pipes K to aid in consuming all of the smoke, soot, &c., and be then passed under the chamber A, and finally upwardly toward the flue through the mass of staggered pipes in the chamber in the rear of the furnace. Any fuel which may be passed through the grate D before being thoroughly consumed will fall upon the grate H and there be subjected to the heat in transit to the flue and be thoroughly consumed and at the same time aid in consuming all of the smoke and other volatile products of combustion. When it is desired to force the fire, the coke may be thrown through the grate D and burned on grate H by opening the draft M³, thus using grate D to coke the coal, the space between D and H to burn the gas therein, and grate H to burn the coke thereon.

Having thus described my invention, what I claim as new therein, and desire to secure by Letters Patent of the United States therefor, is—

1. An improved hot water furnace, comprising a suitable casing, a vertical water chamber extended transversely of the central part of the furnace and having a draft passage in its lower end, a draft passage leading from the furnace in front of the vertical water chamber to the flue, means for closing said passage and a draft passage from the furnace in the rear of the water chamber to the flue, a grate made of water pipes connected with said water chamber, above the draft passage in said chamber and a grate beneath the said draft passage, for the purposes stated.

2. In a hot water furnace, a central chamber, adapted to be extended transversely of a furnace to divide the same into two compartments and having a draft passage in its under central portion, an outward projection on its front face above the central portion having a horizontal under surface, and a series of pipes adapted to form a grate screwed into said horizontal under surface, and extended downwardly and then forwardly, for the purposes stated.

3. In an improved furnace the combination of a hollow water front adapted to be extended transversely of the furnace and having a horizontal bottom, a central water chamber having a draft passage in its lower end, a part of its front face extending outwardly and provided with a horizontal under surface and a grate composed of a number of pipes screwed into the bottom of the front chamber then extended horizontally and then upwardly and screwed into the bottom of said projection on the central water chamber, for the purposes stated.

4. The combination in a hot water furnace of a central chamber adapted to extend transversely of a furnace to divide the same into two parts and having a draft passage formed in its under central portion, notches or steps formed in the lower side portions of its front face, an outward projection formed on its front face and having a horizontal bottom, a water front adapted to extend transversely of the furnace, a grate composed of a plurality of water pipes connected with the horizontal bottom of the projection on the front face of the central water chamber extended downwardly therefrom and then forwardly and finally upward into the said water front, for the purposes stated.

5. The combination in a hot water furnace of a central chamber adapted to extend transversely of a furnace to divide the same into two parts and having a draft passage formed in its under central portion, notches or steps formed in the lower side portions of its front face, an outward projection formed on its front face, and having a horizontal bottom, a water front adapted to extend transversely of the furnace, a grate composed of a plurality of water pipes connected with the horizontal bottom of the projection on the front face of the central water chamber extended downwardly therefrom and then forwardly and finally upward into the said water front, a plurality of pipes connected with the side portions of the central water chamber extended forwardly therefrom and curved backwardly again into the said chamber in the same vertical plane, a plurality of pipes connected with the aforesaid notches or steps in the central water chamber passed forwardly and then upwardly into the water front, and a plurality of pipes connected with the sides of the central water chamber extended forwardly and then downwardly into the water front, all in the same vertical plane, and a plurality of pipes connected with the top and forward surface of the central water chamber projecting forwardly then transversely of the furnace and backward into the central water chamber in the same horizontal plane, for the purposes stated.

6. The combination in a hot water furnace of a central chamber adapted to extend transversely of a furnace to divide the same into two parts and having a draft passage formed in its under central portion, notches or steps formed in the lower side portions of its front face, an outward projection formed on its front face and having a horizontal bottom, a water front adapted to extend transversely of the furnace, a grate composed of a plurality of water pipes connected with a horizontal bottom of the projection on the front face of the central water chamber extended downwardly therefrom and then forwardly and finally upward into the said water pipes, a plurality of pipes connected with the side portions of the central water chamber extended forwardly therefrom and curved backwardly again into the said chamber in the same vertical plane, a plurality of pipes connected with the aforesaid notches or steps in the central water chamber passed forwardly and then rearwardly into the water front, and a plurality of pipes connected with the sides of the forward face of the central water chamber, extended forwardly and then downwardly into the water front, all in the same vertical plane and a plurality of pipes connected with the top and forward surface of the central water chamber projecting forwardly then transversely of the furnace and backward into the central water chamber all in the same horizontal plane, a plurality of pipes connecting with the central chamber below the grate and a series of rows of pipes having horizontal partitions in their central portions extending to a point near their rear ends in a staggered manner, and a row of pipes extending from the bottom of the central water chamber rearwardly, then upwardly and into the central water chamber at its top, all arranged and combined substantially in the manner set forth for the purposes stated.

7. An improved furnace comprising a suitable casing, a central water chamber having notches or steps in its lower side portions, a projection at its front as set forth, a water front having an inclined central top portion as shown and described, the grate composed of a plurality of pipes, elbowed into the central water chamber and the water front as set forth, the pipes at the sides and top of the chamber in the front of the central water chamber, and pipes below the grates connected with the water chamber substantially as shown, the rows of pipes in the back of said central water chamber, substantially as shown and described, the air-feeding pipes below the grate as set forth, the air tubes at the sides of the upper fuel door, the door for feeding air to said tube as set forth, a fuel door above the grate, a second grate below the grate proper, a fuel door above said second grate, a door beneath said grate, a plate at the top of the chamber in the front of the central water chamber, a damper on said plate, and a flue connected with the chamber in the rear of the central water chamber, all arranged and combined to operate in the manner set forth and for the purposes stated.

JOSEPH T. ROBBINS.

Witnesses:
JAMES E. ROBBINS,
THOMAS G. ORWIG.